United States Patent [19]

Ruple et al.

[11] Patent Number: 5,323,949
[45] Date of Patent: Jun. 28, 1994

[54] APPARATUS AND METHOD FOR CUTTING AND TRANSPORTING SCARFED WELD BEAD

[75] Inventors: Lewis H. Ruple; George W. Kaase, both of Perrysburg, Ohio

[73] Assignee: Abbey Etna Machine Company, Perrysburg, Ohio

[21] Appl. No.: 81,608

[22] Filed: Jun. 23, 1993

[51] Int. Cl.$^5$ .................. B23D 1/08; B23K 37/08
[52] U.S. Cl. .................. 228/125; 228/160; 228/13; 228/19; 409/299; 29/33 T; 29/564.8
[58] Field of Search .............. 228/125, 155, 160, 13, 228/17.5, 19; 409/297, 299, 258; 29/33 D, 33 T, 564.8, 566.1

[56] References Cited

U.S. PATENT DOCUMENTS

| | | | |
|---|---|---|---|
| 2,502,012 | 3/1950 | Kinkead | 228/13 |
| 2,781,698 | 2/1957 | Morton | 409/299 |
| 4,710,078 | 12/1987 | Altmeyer et al. | 409/299 |
| 5,192,013 | 3/1993 | Abbey, III et al. | 228/13 |

*Primary Examiner*—Samuel M. Heinrich
*Attorney, Agent, or Firm*—Marshall & Melhorn

[57] ABSTRACT

The invention comprises a method and apparatus for handling the weld bead scarfed from the interior surface of continuous seam welded metal tube or pipe incident to its manufacture. A section of tube of predetermined length is cut from the lead and of the advancing continuous tube, having the scarfed weld bead therein, by a rotary cutter. The speed of the individual section is increased to create a gap between the individual section and the continuous tube, and a scissor mechanism severs the weld bead within the gap. The severed section of weld bead is then conveyed within the associated individual section of tube to a tube accumulation or storage area for removal and disposal.

15 Claims, 2 Drawing Sheets

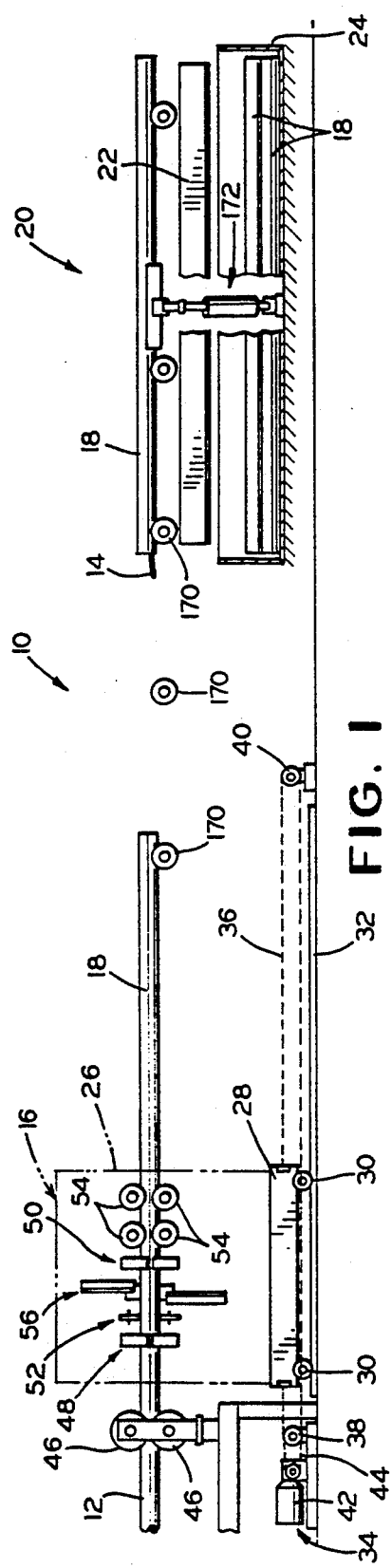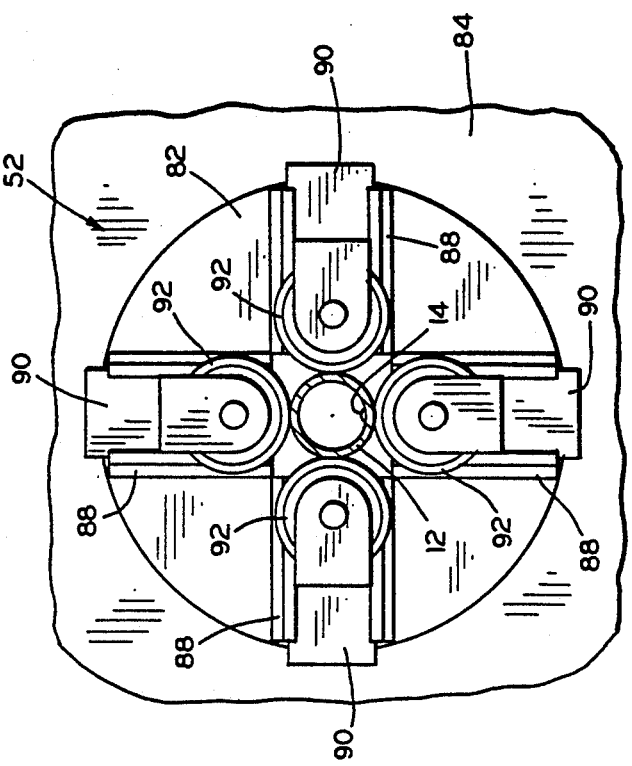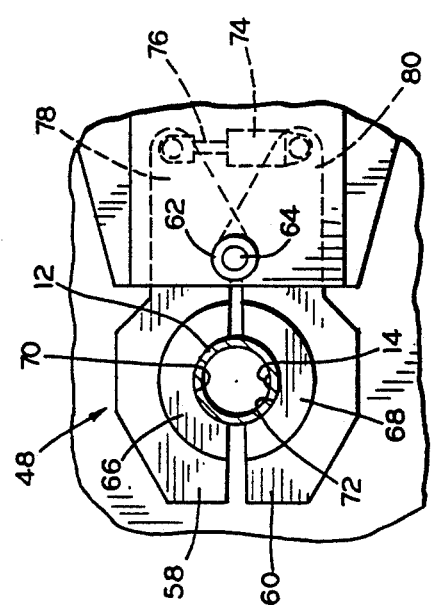
FIG. 1
FIG. 2
FIG. 3

APPARATUS AND METHOD FOR CUTTING AND TRANSPORTING SCARFED WELD BEAD

BACKGROUND OF THE INVENTION

1. Field of the Invention

The present invention relates generally to the manufacture of continuous welded seam metal tubes or pipes, and more particularly to the cutting or severing and disposal of a continuous weld bead scarfed from the interior surface of the tube or pipe as it is manufactured.

2. Description of the Prior Art

In a widely used process for producing welded seam pipes and tubes, a continuous metal strip or skelp is advanced through forming apparatus and progressively shaped into a tubular form having an open, longitudinally extending seam. The formed tube then advances through a welding station wherein the adjacent longitudinal edges are urged together and joined by a suitable welding process. The particular welding process employed will generally be indicated by the material from which the tube or pipe is fabricated, for example, low carbon steel, stainless steel, aluminum, etc., and may include any of the welding techniques conventionally employed with the different materials. Such welding often results in formation of a raised bead or flash extending along the longitudinal weld seam on one or both of the interior and exterior surfaces, and which may be undesirable on the finished product.

In a widely employed preferred process the tube or pipe is subjected to electrical induction so that the edges are heated to fusion temperature and the heated edges are urged together to produce a continuous weld of the seam. As a result of the pressure applied in forcing the heated edges together to achieve fusion, the material bulges both outwardly and inwardly to create a raised bead or flash extending along the weld seam on both the interior and exterior surfaces of the tube or pipe. An apparatus for producing such continuous welded seam tubing is disclosed, for example, in U.S. Pat. No. 5,148,960, issued Sep. 22, 1992.

In order to produce a commercially acceptable product, it is generally necessary to remove the protruding portion of the bead or flash flush with the surface of the tube or pipe. Various devices have been proposed heretofore for removing both the internal bead and the external bead. Removal of the external bead can be accomplished by any of a number of conventional processes such as grinding and scarfing. External surface scarfing apparatus is described, for example, in U.S. Pat. No. 3,249,349, issued May 3, 1966, and U.S. Pat. No. 5,192,013 issued Mar. 9, 1992. Removing the internal bead is, of course more difficult than removing the external bead due to the restricted access to the removal area. A scarfing tool particularly suited for removing the internal bead is disclosed in U.S. Pat. No. 4,600,180, issued Jul. 15, 1986.

Following welding of the seam and severing of the raised internal and external weld beads, the continuous tube or pipe may advance through additional traction and working roll units for sizing. Thereafter, the advancing tube or pipe is severed transversely into sections of predetermined length. The external bead, as indicated, for example, in U.S. Pat. No. 5,192,013, may be collected upon a reel for disposal as it is severed from the tube. The internal bead, however, is not accessible and thus remains within the tube following severance from the internal surface. Cylindrical tube or pipe is generally cut into sections by means of a rotary cutter which rotates around the outer periphery of the advancing pipe and progressively cuts through the pipe wall until the section is severed from the continuous member. The weld bead within the pipe is not, of course, severed by the rotary cutter. Following separation from the continuous member, the individual section is accelerated forwardly for transfer to a storage rack adjacent the production line. The weld bead carried within the tube sections becomes exposed between the sections and tends to break and become entangled in the conveyor mechanism before it can be removed. The weld bead thus not only creates a severe maintenance problem, but also represents a hazard to employees working in the area.

SUMMARY OF THE INVENTION

The aforementioned deficiencies of prior art devices are overcome in accordance with the present invention by immediately creating a gap between the end of the continuous tube and a newly severed section upon severing of the section from the continuous tube, and severing the weld bead within the gap. The independent section of weld bead is then carried within the corresponding tube section to a location remote from the production equipment such as a storage rack area, where it can be suitably removed and disposed of without becoming entangled in the conveyor mechanism or creating a hazard in the workplace.

A carriage is mounted upon rails for reciprocating linear movement along the advancing continuous tube. The tube passes through a rotary cutter mounted upon the carriage for periodically cutting the tube into individual sections of selected length. Clamping devices are provided on the carriage for selectively clampingly engaging the tube on opposite sides of the line of cut to insure that the carriage advances in a fixed location relative to the tube. As the tube and carriage advance, the rotary cutter progressively cuts through the tube wall at the selected position. After the wall is severed, the clamping device engaging the severed section is released and the section is advanced from the carriage at an accelerated rate.

A scissor mechanism is also operably mounted upon the carriage adjacent to and immediately downstream from the rotary cutter. As the severed individual section of tube advances relative to the continuous tube, a gap is opened between the adjacent ends, exposing the strip of weld bead. The scissor mechanism is activated to sever the bead within the gap, and the severed bead is then carried away within the tube section for subsequent removal and disposal. The other clamping device is then disengaged from the continuous tube, and the carriage returns to the starting position to repeat the cycle.

It is, therefore, an object of the invention to provide an improved method and apparatus for handling continuous seam welded pipe or tubing from which the internal weld bead has been scarfed.

Another object of the invention is to provide an improved method of conveying the scarfed internal weld bead away from the tube cutting mechanism in the production of such continuous seam welded pipe or tubing.

Another object of the invention is to provide apparatus for separating the scarfed internal weld bead into discrete sections in conjunction with the cutting of the continuous pipe or tubing into individual sections of predetermined length.

Still another object of the invention is to separate the scarfed internal weld bead into discrete sections while retaining each discrete section within its associated individual tube section for transfer to a remote area, with an end of the weld bead protruding from the tube section interior for facilitating removal therefrom.

Other objects and advantages of the invention will become more apparent during the course of the following description, when taken in connection with the accompanying drawings.

BRIEF DESCRIPTION OF THE DRAWINGS

In the drawings, wherein like numerals are employed to designate like parts throughout the same:

FIG. 1 is a schematic, side elevational view of a portion of a line for producing continuous seam welded tube or pipe and embodying the invention;

FIG. 2 is an enlarged, fragmentary end view illustrating a mechanism for clampingly engaging the tube or pipe on either side of the cutting mechanism as shown schematically in FIG. 1;

FIG. 3 is an enlarged, fragmentary end view illustrating the cutting head of the rotary mechanism employed in separating the continuous tube or pipe into individual sections;

DESCRIPTION OF THE PREFERRED EMBODIMENT

Figure 4:
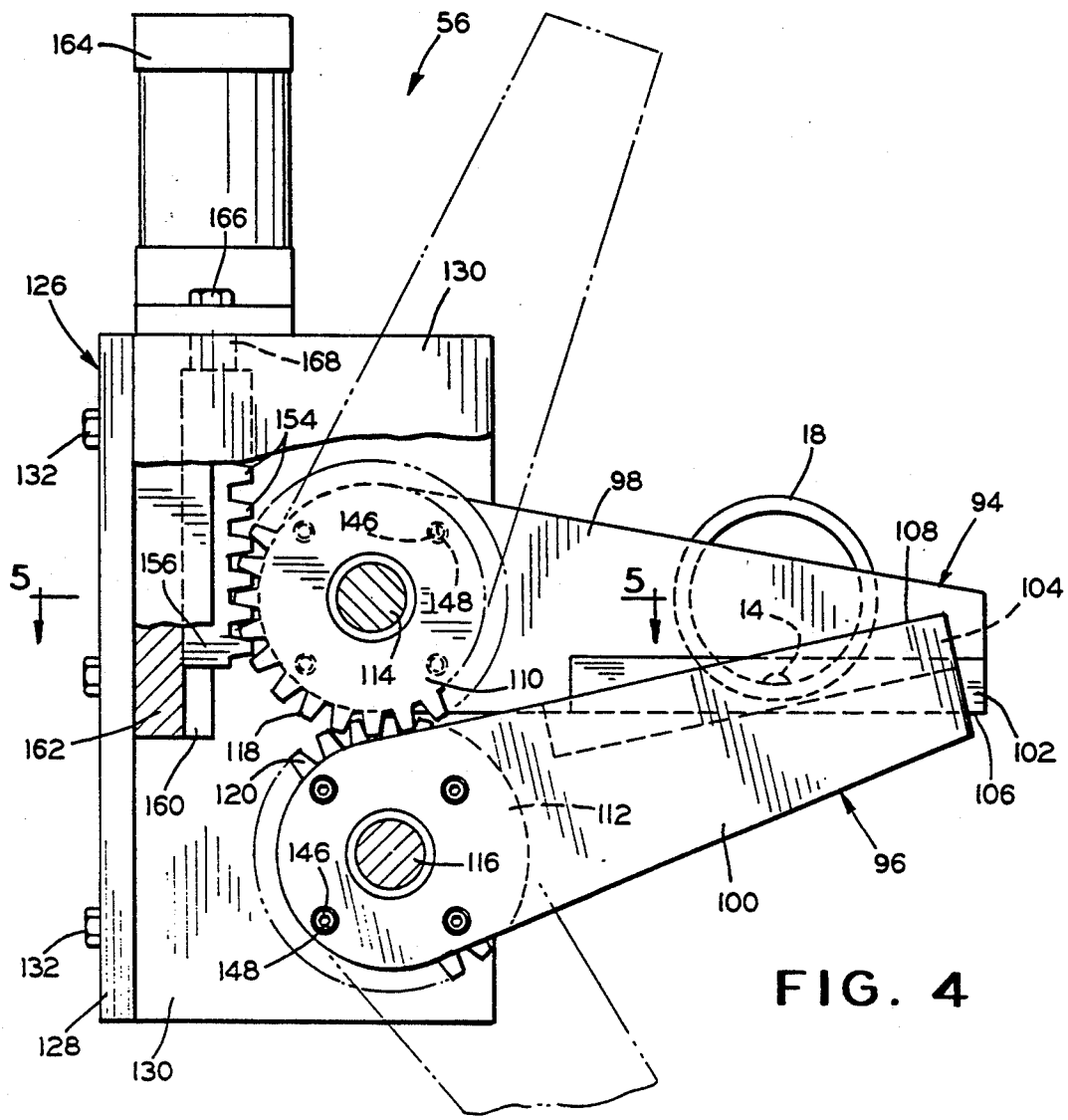
FIG. 4 is an enlarged fragmentary side view of the shear mechanism for severing the scarfed weld bead following separation of an individual section from the continuous tube or pipe.

There is shown generally at 10 in FIG. 1 in schematic form the terminal portion of a tube forming mill for producing a continuous seam welded metal tube or pipe 12. As disclosed and described in the aforementioned U.S. Pat. Nos. 5,148,960 and 5,129,013, in such mills a metal strip or skelp is withdrawn from a supply and advanced through a series of opposed forming rolls and side closing rolls whereby it is progressively bent into tubular form. The formed blank then advances through a welding station wherein the abutting edges are suitably welded to produce a continuous seam welded tube having, incident to the welding, raised beads or flashes extending longitudinally along its inner and outer surfaces. The raised beads may be scarfed from the outer surface and disposed of as described, for example, in U.S. Pat. No. 5,192,013. The raised bead may be scarfed from the interior surface as described in U.S. Pat. No. 4,600,180, so that a separated strip 14 of flash or bead extends longitudinally within the tube 12.

As will be seen in FIG. 1, after the continuous tube 12 emerges from the final sizing and bead scarfing stations (not shown), it enters a mobile or flying cutting unit 16 by which the advancing tube is separated into individual sections 18 of tubing of predetermined length. The individual sections are then conventionally conveyed to an accumulating station 20 where they are diverted as, for example, by being displaced laterally to roll down inclined ramps 22 along either side of the production line for reception in racks 24.

Formation of the tube is, of course, a continuous operation and accordingly the continuous tube 12 must be severed into the individual sections 18 as the tube advances. To that end, the apparatus of the cutting unit 16 includes a suitable structural framework (not shown) enclosed within a housing illustrated schematically at 26 and mounted upon a carriage base 28. The carriage base includes pairs of wheels 30 adapted to ride upon a pair of spaced rails 32 extending longitudinally along the path of the advancing tube. A drive mechanism 34 is provided for advancing and retracting the carriage in a reciprocating manner upon each cycle of the tube and bead cutting mechanism. The drive mechanism may comprise a chain or belt 36 entrained over a drive roller 38 at one end of the path of the carriage and an idler roller 40 at the opposite end. The chain or belt is attached to the carriage base 28 as at the opposite ends, and a suitably controlled reversing gear reduction drive unit 42 is drivingly coupled to the roller 38 as by a drive chain 44 or drive shaft (not shown).

The advancing tube 12, having the scarfed bead strip 14 entrained therewithin, is directed between opposed rollers 46 of the tube mill into the housing 26 of the cutting unit. As shown in FIG. 1, there is provided within the housing 26 mechanism whereby the travelling cutting unit 16 is selectively coupled to the tube 12 for advancement therewith, the tube is severed to form an individual tubing section 18, the section 18 is separated from the continuous tube to create a gap therebetween, and the bead strip 14 is severed within the gap. To that end, there is suitably mounted upon a framework (not shown) within the housing 26 and carried by the carriage base 28, first and second clamping units 48 and 50 adapted to selectively clampingly engage the tube, a rotary cutter unit 52 for periodically severing the wall of the tubing, one or more roll units 54 through which the tube advances, and a bead shear unit 56.

The carriage 28 and the housing 26 thereon incorporating the first and second clamping units 48 and 50, the rotary cutter unit 52 and the traction units 54, are of generally conventional construction as have been employed heretofore in the production of continuous seam welded tubing. The clamping units selectively engage the advancing tube 12 on either side of the point at which the tube wall is to be severed to insure that the movement of the carriage base carrying the cutting equipment will be synchronized with the movement of the advancing tube. The clamping units further insure that the tube will be held in a fixed, stabilized position as the rotary cutter unit 52 rotates about the tube in cutting the tube wall.

The clamping units 48 and 50 are of similar construction and, as illustrated in FIG. 2, may each include cooperating first and second jaw members 58 and 60, respectively. Each jaw member includes a pair of spaced bushings 62 (only one shown) by means of which the jaw members are mounted upon a shaft 64 for pivoting movement between open and closed positions. The shafts are suitably mounted upon the framework of the cutting station 16. The jaws 58 and 60 are provided with removable clamping inserts 66 and 68, respectively, having curved tube-facing surfaces 70 and 72 configured to follow the contour of the wall of the tube 12. The clamping inserts are adapted to be readily removed and replaced with inserts having surfaces 70 and 72 of different configurations consistent with the different diameter and cross-sectional configurations of tubing which may be produced by the apparatus. In order to selectively move the clamping inserts 66 and 68 between the closed position, in clamping engagement with the tube 12 as shown in FIG. 2, and an open position disengaged from the tube (not shown), suitable actuating means such as a solenoid or a fluid operated cylinder may be provided for pivoting the jaw members 58 and 60 about the shaft 64. To that end, a cylinder 74 having an axially extensible and retractable piston rod 76 may be operably interconnected between rearwardly extending portions 78 and 80 of the jaw members 58 and 60.

The rotary cutter unit 52 may be of conventional construction and generally includes a mounting plate 82 suitably journalled for rotation about the tube 12 within a carrier frame 84 supported by the framework within the housing 26. The mounting plate includes a central opening 86 through which the advancing tubing passes. Radially oriented slideways 88 are carried by the mounting plate 82 for rotation therewith about the tubing 12. Brackets 90 slideable axially within the slideways carry freely rotatable cutting wheels 92 at their inner ends. Means (not shown) is conventionally provided for selectively urging the brackets 90 inwardly to place the cutting wheels 92 into engagement with the wall of the tubing 12 and for retracting the brackets to permit advancement of the tubing into and through the mounting plate.

As the mounting plate 82 rotates and the cutting wheels 92 are urged against the wall of the tube, they sever the tube wall to create an individual section 18 of predetermined length. The severed section is then advanced as by the traction units 54 to create a gap between the adjacent ends of the individual section 18 and the continuous tube 12 from which it has been severed. The bead, of course, is not severed by the rotary cutter unit 52, and since it remains intact is exposed within the gap between the separated tube ends. The bead shear unit 56 is positioned to expeditiously sever the bead upon opening of the gap so that the severed bead section can be carried away within the tubing section 18 and the carriage 28 can be returned to the rest position for the start of the next cycle.

Figure 5:
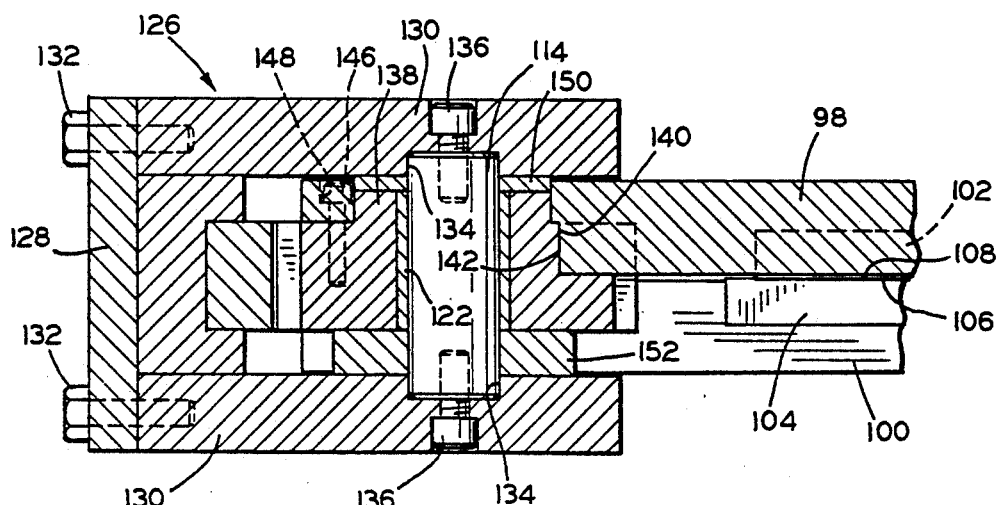
FIG. 5 is a sectional view taken substantially along line 5—5 of FIG. 4.

To that end, the bead sheer unit 56 is mounted within the cutting unit 16 immediately downstream from the rotary cutter unit 52. As best seen in FIGS. 4 and 5, the sheer unit comprises a pair of cooperating upper and lower shear blades assemblies 94 and 96, respectively, mounted to pivot between the closed, shearing position shown in solid lines and the open, rest position shown in broken lines. As will be apparent, the shear blades and the mounting and actuating mechanism therefore are of generally identical construction, modified only for right hand and left hand positions.

The sheer blade assemblies 94 and 96 include elongated blade members 98 and 100, respectively, having bevelled edge sections 102 and 104 defining sharpened cutting edges 106 and 108 for cooperating in scissor fashion to periodically sever the bead strip 14. The blades 98 and 100 are mounted upon pinion gears 110 and 112 rotatably carried by axles 114 and 116, respectively. The pinion gears are preferably of equal diameter and are provided with equal numbers of intermeshing teeth 118 and 120 so that as the upper gear 110 is rotatably driven in one direction, the lower gear 112 will rotate in the opposite direction by a similar amount.

The blade assemblies of the bead sheer unit 56 are mounted within a housing 126 carried in a conventional manner by the framework (not shown) of the cutting unit 16. The housing comprises a mounting or back plate 128 to which spaced side plates 130 are affixed as by stud bolts 132. The ends of the axles 114 and 116 are carried within cylindrical recesses 134 in the side plates 130, secured as by cap screws 134 tapped into the ends of the axles.

As best seen in FIG. 5, the upper blade member 98 is mounted for rotary movement with the pinion gear 110. The pinion gear is formed with a raised annular boss 138 on one of its end faces. A portion of the gear and boss is removed to form a recessed segment 140. The blade member 98 is formed with an opening 142 in its rear portion, the configuration of the opening being complementary to that of the boss and the recessed segment 140. The opening 142 thus fits over the boss 138 and recessed segment 140 to mount the blade member upon the pinion gear. Cap screws 144 threaded into the pinion gear and having heads 146 received in recesses 148 in the blade member secure the blade member to the pinion gear. The irregular, non-circular shape of the opening 142 and mating boss 138 and the segment 140 received therein assures that the blade 98 will not slip on or rotate relative to the pinion gear 110.

The lower blade member 100 and the lower pinion gear 112 are of a construction generally identical to but reversed from that of the upper blade 98 and the pinion gear 110. The shear blade assemblies 94 and 96 must be offset from the center line within the housing 126 so that the cutting edges 106 and 108 of the blades 98 and 100 will cooperate to create a shearing action as the blades pivot into overlapping relationship. To that end, a relatively thin spacer washer 150 is provided between the rear side plate 130 and the upper pinion gear 110 as viewed in FIG. 5, and a somewhat thicker spacer washer 152 is provided on the opposite side of the pinion gear. Similar spacer washers (not shown) are provided in reversed positions for the lower pinion gear 112, so that the blades 98 and 100 are properly offset from one another.

As seen in FIG. 4, the teeth 118 and 120 operatively intermesh so that the pinion gears 110 and 112 counterstate to selectively move the shear blades 96 and 98 between the open position depicted in broken lines and the closed, bead-shearing position shown in solid lines. Teeth 154 of an elongated rack gear 156 drivingly engage the teeth 118 of the upper pinion gear 110 for selectively rotating the pinion gears, and hence the shear blades 94 and 96. The rack gear is mounted for linear sliding movement along a channel 160 formed in a block 162 affixed along the back plate 128 between the side plates 130. A linear actuator, such as a hydraulic or pneumatic cylinder 164 affixed to the housing 126 as by stud bolts 166, includes a piston rod 168 suitably connected to the rack gear 156. Thus, upon extension and retraction of the piston rod the rack gear is similarly advanced and retracted to correspondingly rotate the pinion gears 110 and 112.

In operation of the invention, the tube or pipe 12 is continuously formed, the seam is welded and the raised weld beads are scarfed along the exterior and interior surfaces of the tube. The external bead is conventionally collected and disposed of as it is scarfed from the tube. A continuous bead of scarfed weldment material 14 advances within the continuous tube 12 as the tube is received at the cutting unit 16. With the carriage 28 at its stationary rest position, the tube advances through the housing 26 and the opened clamping units 48 and 50, the retracted rotary cutter unit 52, the bead sheer unit 56 and the roll units 54, to be received on conveyor rollers 170 (FIG. 1). As the point at which the tube 12 is to be severed to produce a section 18 of selected length approaches the rotary cutter unit 52, the drive mechanism 34 is activated to bring the carriage base 28 and the cutting unit 16 up to the speed of the advancing tube, and to position the cutter unit for cutting the tube to the desired length.

With the cutter unit properly positioned along the tube the jaws 58 and 60 are closed to clamp onto the tube on either side of the rotary cutter unit 52. The cutter unit is then activated and the cutting wheels 92 are urged into engagement with the tube to progressively sever the tube wall. When the wall has been severed and an individual section 18 separated from the continuous tube 12, the cutting wheels are retracted and the second or forward clamping unit 50 is released. The roll units 54 and conveyor rollers 170 then advance the newly separated section 18 away from the continuous tube 12 and open a gap between the newly severed adjacent ends of the two sections.

The continuous strip of scarfed weld bead 14 is thereby exposed within the gap. When the trailing end of the tube section 18 has cleared the bead shear unit 56, the cylinder 164 is operated to retract the piston rod 168, thereby swinging the blade members 98 and 100 to the closed position as shown in solid lines in FIG. 4 and severing the bead 14 within the gap. The ends of the bead strip will, of course, extend from the adjacent ends of the tube 12 and section 18 within the gap following severing by the bead shear unit. Due to the advancement of the newly severed section 18 to open up the gap prior to severing of the bead strip, the bead strip will be pulled rearwardly within the individual tube section 18 a short distance so that its forward end may be drawn into the tube section. However, the rear end section of the severed bead strip will extend a short distance beyond the end of the tube section. As the tube section 18 is advanced from the cutting station 16 to the accumulating station 20 upon the conveyor rollers 170, the severed bead strip will be confined within the section 18 with a portion extending from the tube section as shown in FIG. 1. At the accumulating station, the tube section can be laterally displaced as by a conventional kicker unit 172 to roll down the appropriate inclined ramp 22 onto the accumulating rack 24.

Immediately following severing of the bead strip 14, the blades 98 and 100 are retracted. The first clamping unit 48 is then released and the drive mechanism 34 returns the carriage 28 and cutting unit thereon to the ready position to begin the next cutting cycle. The bead strip 14 is thus safely and efficiently removed from the congested area of the continuously operating tube forming and cutting unit to a remote storage area. At the accumulating area or a subsequent storage area the sections of bead strip 14 can be withdrawn from the individual tube sections 18 and disposed of as may be convenient.

It is to be understood that the forms of the invention herewith shown and described are to be taken as illustrative embodiments only of the same, and that various changes in the shape, size and arrangement of parts, as well as various procedural changes, may be resorted to without departing from the spirit of the invention.

What is claimed is:

1. A method of handling a continuous weld bead scarfed from the interior surface in production of a continuous seam welded tube, comprising advancing the continuous tube having the scarfed weld bead contained therewithin along a predetermined path, cutting the wall of the tube to separate a section of tube of predetermined length from the leading end of the continuous tube, advancing the section of tube along the path away from the continuous tube to create a gap between the section and the continuous tube and expose the continuous weld bead within the gap, severing the weld bead within the gap to create an individual section of weld bead disposed within the individual section of tube, and advancing the tube section and the weld bead section therewithin to a remote location for disposal of the weld bead section.

2. A method of handling weld bead as claimed in claim 1, including cutting the wall of the tube by rotating a cutter around the tube and progressively cutting through said walls whereby said bead remains intact.

3. A method of handling weld bead as claimed in claim 1, wherein the weld bead is severed by shearing said bead within said gap between the continuous tube and the individual section of tube.

4. A method of handling weld bead as claimed in claim 1, comprising advancing the continuous tube through a mobile cutting station including, in succession, a first clamping means, a rotary cutting means, a bead shear means and a second clamping means, including the steps of bringing the mobile cutting station up to the speed of the advancing continuous tube with the rotary cutting means in position along the continuous tube for cutting said section of tube of predetermined length from said continuous tube, engaging the first and second clamping means upon the continuous tube, operating the rotary cutter to sever the section of tube from the continuous tube, disengaging the second clamping means from the severed section of tube, advancing the severed section away from the continuous tube to create said gap, operating the bead shear means to sever the weld bead within said gap, disengaging the first clamping means from the continuous tube, and positioning the mobile cutting station for repeating the sequence of steps.

5. Apparatus for handling weld bead scarfed from the interior surface in producing a continuous seam welded tube and disposed within the continuous tube, including tube cutting means for cutting a section of tube of predetermined length from the leading end of the continuous tube, means for advancing the section of tube away from the continuous tube to create a gap between the adjacent ends of the continuous tube and the section of tube within which the continuous weld bead is exposed, and shear means operable to sever said continuous weld bead within said gap whereby a separated section of weld bead is disposed within and carried by said section of tube.

6. Apparatus for handling weld bead as claimed in claim 5, including means for conveying the individual section of tube with the separated section of weld bead therein to a location remote from the tube cutting means and the shear means.

7. Apparatus for handling weld bead as claimed in claim 5, wherein said continuous tube is advancing during the cutting of said section of said tube and the severing of said weld bead, including means mounting said tube cutting means and said bead shear means for advancement with said continuous tube during said cutting and said severing.

8. Apparatus for handling weld bead as claimed in claim 7, said mounting means comprising a carriage mounted for reciprocating cycling movement along said advancing tube, and drive means for selectively advancing said carriage with said advancing tube and retracting said carriage to a rest position following said tube cutting and bead shearing.

9. Apparatus for handling weld bead as claimed in claim 8, including a first clamping unit mounted upon said carriage for selectively clampingly engaging the tube ahead of said tube cutting means and a second clamping unit mounted upon said carriage for selectively clampingly engaging the tube behind said shear means.

10. Apparatus for handling weld bead as claimed in claim 5, wherein said shear means comprises first and second blade members mounted for pivoting movement in shearing overlapping relationship, said first and second blade members being operably interconnected to pivot in opposite directions.

11. Apparatus for handling weld bead as claimed in claim 10, said first blade member being affixed to a first pinion gear and said second blade member being affixed to a second pinion gear, said first and second pinion gears being pivotably mounted in intermeshing relationship.

12. Apparatus for handling weld bead as claimed in claim 11, including a rack gear mounted for reciprocating linear movement in intermeshing relationship with one of said first and second pinion gears.

13. Apparatus for handling weld bead as claimed in claim 12, including linear actuator means operably connected to said rack gear for selectively advancing and retracting said rack gear whereby said first and second blade members are pivoted in said opposite directions.

14. Apparatus for handling weld bead as claimed in claim 8, said shear means comprising a first blade member affixed to a first pinion gear and a second blade member affixed to a second pinion gear, said first and second pinion gears being pivotably mounted in intermeshing relationship.

15. Apparatus for handling weld bead as claimed in claim 14, including a rack gear mounted for reciprocating linear movement in intermeshing relationship with one of said first and second pinion gears, and linear actuator means operably connected to said rack gear for selectively advancing and retracting said rack gear to thereby pivotably swing said first and second blade members in said opposite directions.

* * * * *